United States Patent [19]
DeLuca

[11] Patent Number: 5,254,986
[45] Date of Patent: Oct. 19, 1993

[54] NATION-WIDE PAGING WITH LOCAL MODES OF OPERATION

[75] Inventor: Michael J. DeLuca, Boca Raton, Fla.

[73] Assignee: Motorola, Inc., Schaumburg, Ill.

[21] Appl. No.: 646,483

[22] Filed: Jan. 25, 1991

Related U.S. Application Data

[63] Continuation of Ser. No. 425,658, Oct. 23, 1989, abandoned.

[51] Int. Cl.⁵ .............................................. H04B 7/00
[52] U.S. Cl. ........................... 340/825.44; 340/311.1; 340/825.47
[58] Field of Search ............. 340/825.44, 825.47, 340/825.49, 311.1; 379/57, 59, 63; 455/33, 34

[56] References Cited

U.S. PATENT DOCUMENTS

| | | | |
|---|---|---|---|
| 4,644,347 | 2/1987 | Lucas et al. | 340/825.04 |
| 4,818,987 | 4/1989 | Ide et al. | 340/825.44 |
| 4,829,466 | 5/1989 | Davis et al. | 364/900 |
| 4,849,750 | 7/1989 | Andros et al. | 340/825.44 |
| 4,910,511 | 3/1990 | Nagata et al. | 346/825.44 |
| 4,943,803 | 7/1990 | Vrijkorte | 340/825.49 |

Primary Examiner—Sandra L. O'Shea
Assistant Examiner—Dervis Magistre
Attorney, Agent, or Firm—Daniel R. Collopy; William E. Koch; Thomas G. Berry

[57] ABSTRACT

An improved selective call addressing scheme provides local mode paging capability in a wide area paging network. A selective call receiver used in this system will configure its operating parameters by selecting one of a plurality of operational personalities in response to the presence or absence of a specific received signal having a signal indicative of the area in which the pager is operating.

14 Claims, 4 Drawing Sheets

NATION-WIDE PAGING WITH LOCAL MODES OF OPERATION

This is a continuation of application Ser. No. 07/425,658, filed Oct. 23, 1989, now abandoned.

FIELD OF THE INVENTION

This invention relates in general to radio paging systems and more particularly to a nation-wide paging system with multiple local modes of operation.

BACKGROUND OF THE INVENTION

Paging systems typically use a receiver that has at least one unique selective call address associated therewith. This receiver is commonly referred to as a selective call receiver or pager. When a pager receives and decodes its address, the pager typically alerts the user to the presence of incoming information and operates to present this information. The receiving, decoding, alerting, and presenting sequence as well as other functional aspects associated with the pager are commonly referred to as the pager's personality. A unique operational personality is programmed in the pager by the service provider before delivery, and generally cannot be modified by the user or provider without returning the pager to a service depot.

Wide area paging systems for the transmission and reception of radio frequency information are well known to those skilled in the art. In the United States, wide area paging systems are licensed for operation on radio frequency carriers that are restricted to a maximum effective radiated power output of 200 watts. This power limitation and the radio frequency attenuation associated with the physical characteristics of the surrounding environment, limits the ground path propagation of radio frequency energy. A typical paging signal that is transmitted from a ground based antenna system will effectively cover an average metropolitan area of approximately 400 square miles.

Alternative approaches have been tried to increase the area of coverage for a wide area paging system. One method is the use of multiple distributed transmission sites that simulcast (simultaneously broadcast) the information signal on the same radio frequency carrier. Geographic coverage is improved using this method, but due to a critical shortage of available land-mobile channel assignments in the VHF (very high frequency) band and governmental restrictions, a service provider cannot implement this system on anything other than a in the recently approved 900 MHz nation wide paging services The nation wide paging concept uses a block of channels specifically allocated for nation wide paging services. In this system, the service provider supplies the user with a pager that uses a common receive frequency for the areas in which the person will be travelling. The user's pager will then be able to receive the correct radio frequency carrier and address information, but because of the sheer volume of information associated with a network of this kind, the message may take an hour before broadcast to the user. If the user happens to travel to a location where a different service provider has a paging system on the user's assigned radio frequency carrier, chances are that the user's pager will not function.

The aforementioned scenarios are generally not acceptable to a business user that needs their information as soon as possible. A real time messaging system is required to effectively relay information to a paging subscriber.

Thus, what is needed is an method that provides a selective call receiver with dynamic personality and local address configuration.

SUMMARY OF THE INVENTION

Accordingly, it is an object of the present invention to provide an improved selective call addressing method that enables local mode paging in a nation wide paging network.

In carrying out the above and other objects of the invention in one form, there is provided a method for receiving a signal indicative of a location and operating a selective call receiver in one of a plurality of predetermined personalities which is selected in response to the received signal.

DETAILED DESCRIPTION OF THE INVENTION

In addressing the problem of a nation-wide (wide area) paging system from the service provider's point of view, the most important criteria is the raw throughput available as a function of the system loading (the number of users attempting to access the system at any point in time as compared to the number of messages pending transmission), baud rate (the number of data units transmitted per second), and the efficiency of the addressing scheme. Using a digital selective call addressing scheme such as POCSAG (developed by Great Britain's Post Office Code Advisory Group) or Golay Sequential Code, the number of selective call addresses available in a digitally coded system is limited only by the effective length of the addressing word.

In a nation-wide system, it is desirable for the number of available addresses to be around one billion. This can be represented by a digital address code word that has a minimum of 30 address bits ($2^{30} \approx 1$ billion). When parity is added, a nation-wide address can occupy two 32,21 code words. The notation 32,21 denotes a 32 bit code word comprising 21 information bits and 11 parity bits for error detection and correction. Using conventional techniques, the increase in transmitted address bits to address one billion pagers will cause a nation-wide paging system to "bog down." To improve throughput of a wide area signalling system, a user's selective call receiver (pager) can be registered as a local user in a participating area of a wide area paging system. This gives a user the advantages associated with a local paging system such as low-latency messaging using a single 32,21 code word address. By using the local mode with a single 32,21 code word address, the service provider will effectively double the addressing throughput and significantly improve the overall system efficiency.

Figure 1:
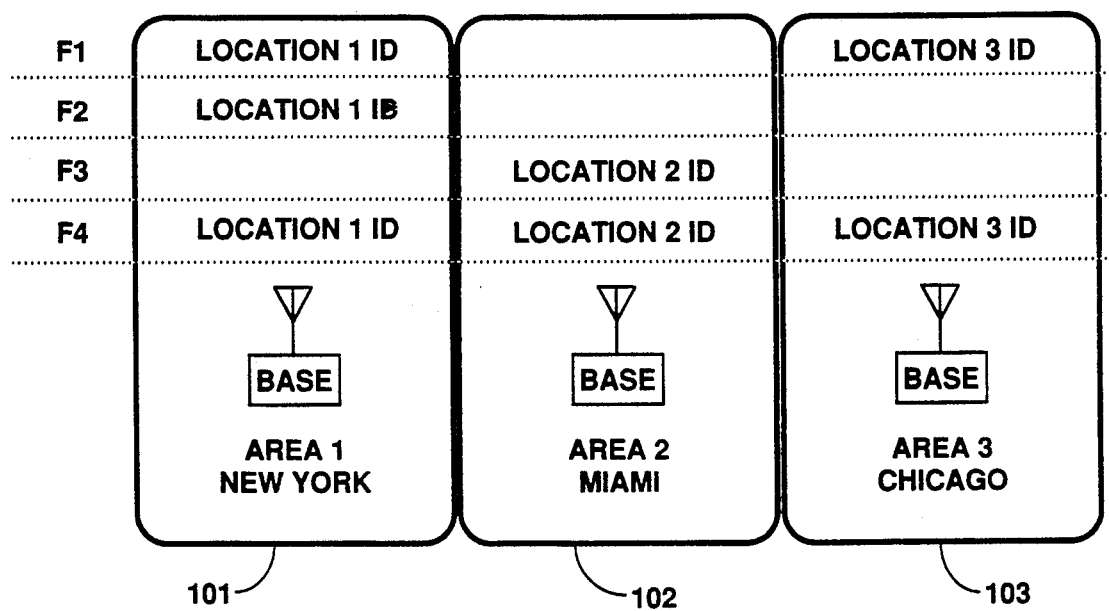
FIG. 1 is a system infrastructure diagram in accordance with the preferred embodiment.

Referring to FIG. 1, the preferred embodiment of a wide area selective call signalling system comprises networked base stations that are accessed via data entry devices (eg. computers, telephones). Each base has its own selective call signalling encoder and transmitter. The transmitters may have more than one frequency (denoted on FIG. 1 by F1, F2, F3, F4) depending on the channel loading in a particular area. As shown in FIG. 1, the New York area 101 uses three frequencies, F1, F2, and F4. If the user requires a pager that will function in all three areas 101, 102, 103, but the user rarely being "primary" (meaning the user is most likely to be in this area) in New York 101 on frequency F4 and Chicago 103 on frequency F1. Local addresses are assigned to the pager for each registered service area. These assigned addresses need not be unique in different service areas. In this configuration, the user can travel to any of the three areas 101, 102, 103, and receive pages.

When the user travels to New York 101 or Chicago 103, the user's pager will respond to the local area address assigned in the respective areas. This local area address is automatically selected by the user's selective call receiver when the New York 101 or Chicago 103 area location ID is recognized. In Chicago, 103, the pager scans receive frequencies until it receives and decodes the location ID transmitted on frequency F4 (for example) then automatically switches to the predetermined receive frequency F1 and loads the predetermined local area address for Chicago 103. When the pager no longer receives the transmitter signal, the user has left Chicago 103 and the receive frequency automatically reverts to its nation-wide frequency scanning mode. If the user has planned a trip to Miami 102 and would like the pager to be operational in the Miami 102 area, the user would call the service provider and request that the Miami 102 system broadcast messages directed to the user on the pager's nation-wide address. The Miami 102 system would then broadcast messages directed to the user on the pager on all available frequencies using the nation-wide address of the pager. Thus, the pager may receive messages in Miami 102 without causing the system in Miami 102 to "bog down" by sending messages with longer nation-wide addressing on a plurality of frequencies. Note the same messages are transmitted in New York 101 and Chicago 103 on a single frequency with a shorter local address thereby relieving "bog down" in these areas.

Figure 2:
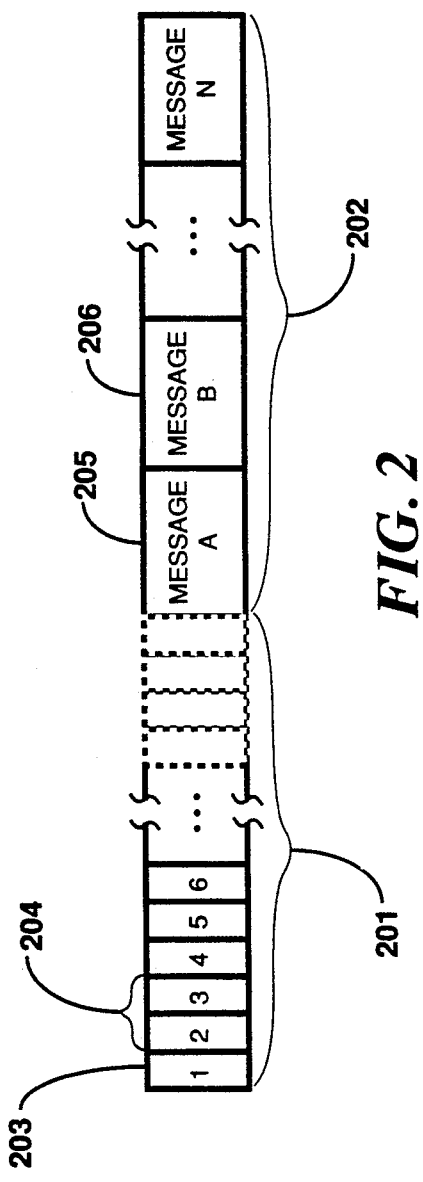
FIG. 2 is a diagram of prior art wide area selective call signalling format.

Referring to FIG. 2, a selective call signalling format comprises an address field 201 and message field 202. The address field comprises pager addresses of one word 203 and two words 204. In this diagram, the single word pager address 203 and dual word pager address 204 have corresponding information in message A 205 and message B 206, respectively.

Figure 3:
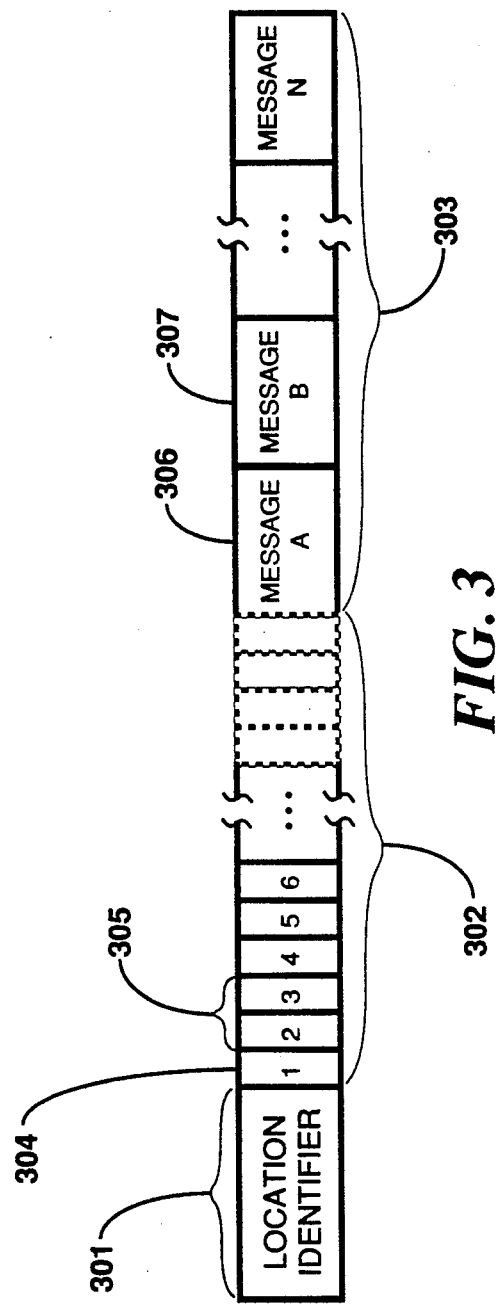
FIG. 3 is a diagram of the improved wide area selective call signalling format in accordance with the preferred embodiment.

Referring to FIG. 3, the preferred embodiment of the improved wide area selective call signalling format comprises a location identifier 301, address field 302, and message field 303. The address field comprises pager addresses of one word 304 and two words 305. In this diagram, the single word pager address 304 and dual word pager address 305 have corresponding information in message A 306 and message B 307, respectively. Interleaving, as used in selective call signalling protocols, is defined as the orderly insertion of a predetermined information word (for example an address or pre-address data word) within a data stream. In the case of a location identifier, it is broadcast in a time window that has minimum and maximum spacings specified between transmissions in order for the pager to properly recognize the location identifier. In the preferred embodiment of the present invention, the improved wide area selective call signalling format transmission is interleaved at a predetermined interval with the selective call signalling format shown in FIG. 2 to provide transmission of the location identifier 301 for reception by active paging receivers. Alternatively, the location identifier 301 may be transmitted in a stand-alone fashion (meaning there is no connection with the actual addressing-messaging data block shown in FIG. 2) while maintaining an acceptable interleave interval for detection by active paging receivers.

Figure 4:
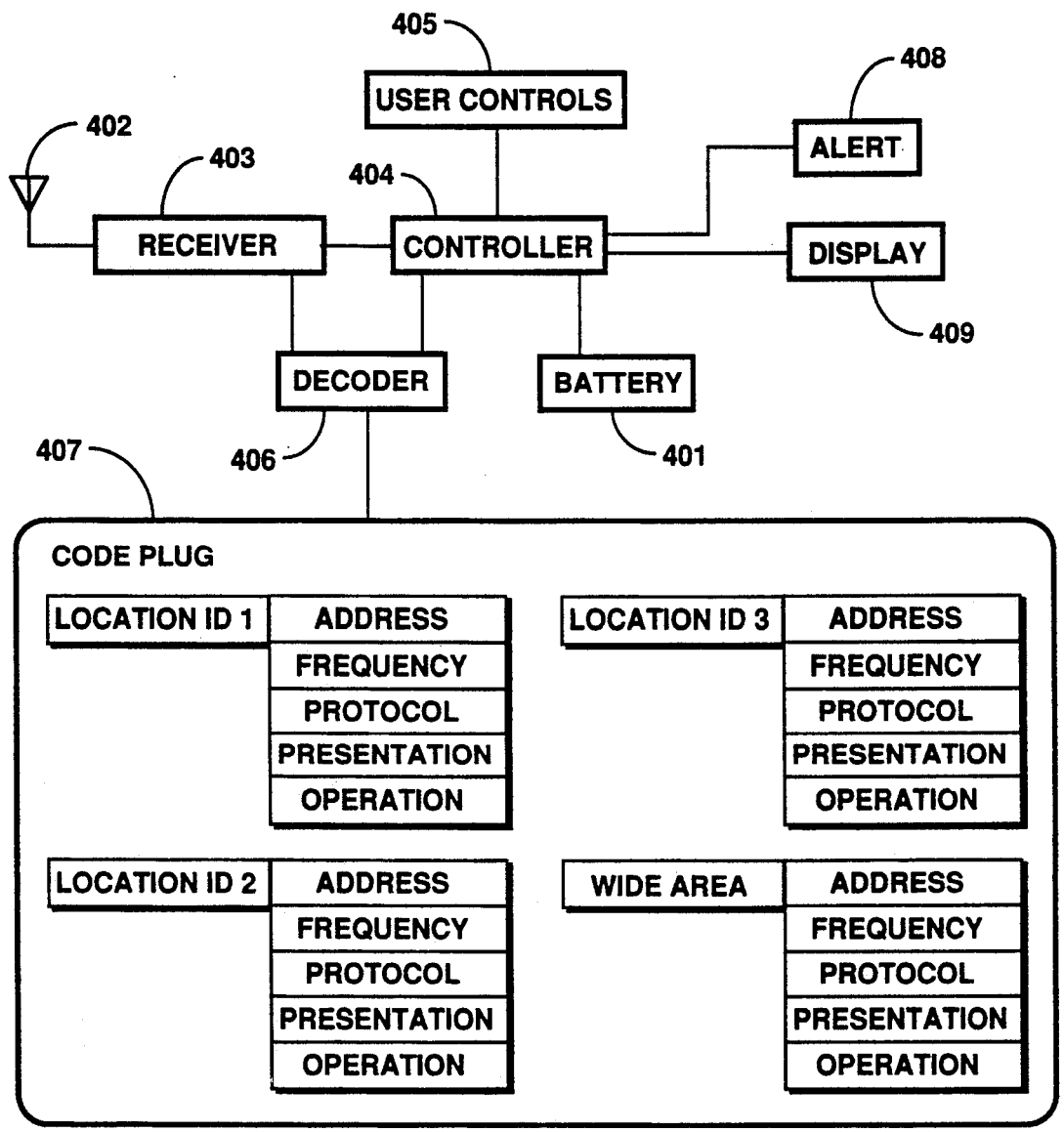
FIG. 4 is a block diagram of the selective call receiver system in accordance with the preferred embodiment.

Referring to FIG. 4, the block diagram shows the preferred embodiment of a battery 401 powered selective call receiver (pager) which implements the present invention. The transmitted signal is coupled via an antenna 402 to the receiver 403 for recovery of the modulated data. The recovered data is coupled to the controller 404 and decoder 406. The controller 404 manages the operation of the pager's receiver 403, decoder 406, user controls 405, alert 408 presentation means, and display 409 presentation means.

When the pager is activated by the user, the controller 404 commands the decoder 406 to read the default wide area information from the code plug 407. The pager then configures its operational characteristics according to the data read from the code plug 407 associated with the wide area mode. When a signal is decoded by the decoder 406 that contains a valid address for the wide area mode, the decoder notifies the controller to take the appropriate actions to alert the user and present the received information.

In the case where the user is in an area that uses one of the location ID's programmed in the code plug 407, the pager will configure its operational characteristics accordingly and search for the address associated with the active location ID.

Each location ID as well as the wide area default structure has a personality associated with it. These "personalities" are programmed by the service provider and comprise a selective call address, receive frequency, protocol mode, presentation mode, and operation mode. The code plug 407 is shown having 4 personalities. Three of the personalities are dependant upon the pager being in one of three predetermined areas and the fourth personality being dependant on the pager being in an area other than the three predetermined areas. Using the location ID as the determiner, the pager can alter its complete mode of operation when travelling from one area to another. This feature can be very useful if, for example, a user desires a fully functional alphanumeric pager in the area where their home office and local paging service provider has alphanumeric input capability, and a low latency tone-only numeric pager in a rural area where the paging service provider may only have tone-only numeric capability.

Dynamic re-configuration of the pager by selecting different personalities has many advantages. In the previous example, the user had two personalities corresponding to two different areas. The first personality having alphanumeric capability, uses a local address (an address option that lowers the service provider's system overhead), local area frequency F2 (a frequency dedicated for local area addressing), high speed coding (a protocol mode option for faster information delivery), extended frame data interleaving (a protocol mode option for improved battery life), alphanumeric display (a presentation mode option allowing the display of both numeric and alpha characters), and silent alert capability (an operation mode option enabling a mechanical vibrator when alerted). The second personality having tone-only capability, is set-up as the default wide area personality. The second personality uses a two word wide area address (an address option), wide area frequency F1 (a shared frequency dedicated for wide area addressing and location identification), normal speed coding (a protocol mode option), normal frame data interleaving (a protocol mode option for normal battery life), numeric display (a presentation mode option allowing the display of numeric characters), and audible alert capability (an operation mode option enabling an acoustic transducer when alerted).

The protocol mode selected within a personality functions to control parameters associated with the selective call coding format such as the baud rate (number of information bits per second) and receiver battery saver rate (the on/off strobing of circuitry within the pager to extend battery life).

The presentation mode selected within a personality functions to control parameters associated with the pager's information presentation means. Examples of selections available for information presentation are numeric, alphanumeric, or graphic modes.

The operation mode selected within a personality functions to control parameters associated with the pager's messaging capability and alerting functions. Messaging modes can include tone-only, tone numeric, tone & voice, tone & voice numeric, or alphanumeric to name a few. Alerting modes commonly used include audible tone alert and sensible vibrating alert as well as a selection between various alert tones, patterns, or melodies.

Figure 5:
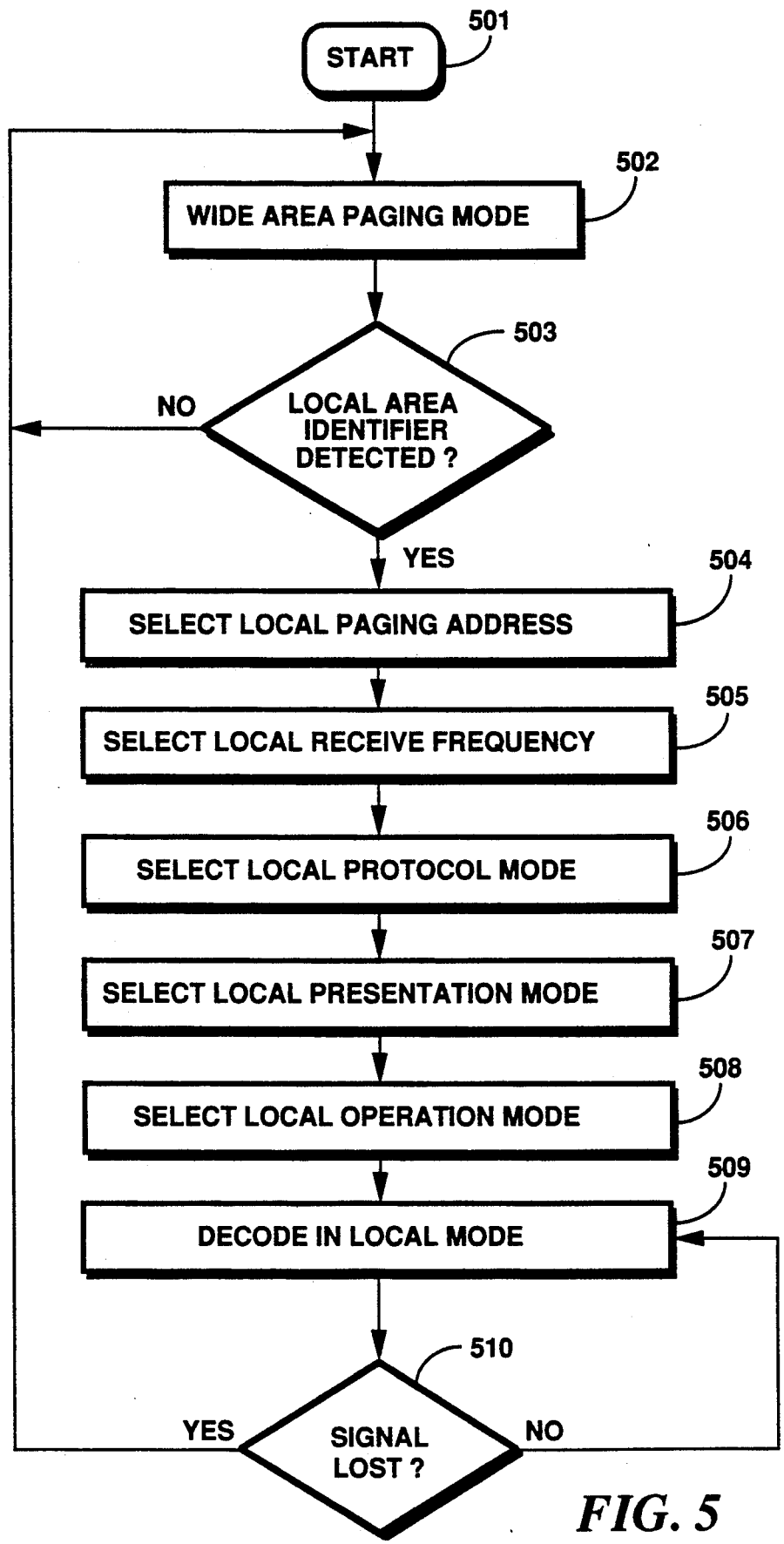
FIG. 5 is a flow diagram of the selective call receiver's personality selection algorithm in accordance with the preferred embodiment.

Referring to FIG. 5, when the pager is activated 501 it loads the default personality that corresponds to the wide area paging mode 502. When the pager is in the wide area paging mode, it continuously searches each channel (frequency) for received data indicative of a protocol for which the pager receives messages. The data may be in the form of a baud rate or a predetermined synchronization signal. Upon finding such a channel, it searches for its corresponding wide area selective call address and any local area identifier that is broadcast. If a valid local area identifier is detected 503, the pager then selects the appropriate local parameters that correspond with the detected local area identifier. The selected local area personality is enabled by selecting the local paging address 504, local receive frequency 505, local protocol mode 506, local presentation mode 507, and local operation mode 508. When personality configuration is complete, the pager changes from the wide area mode to the local mode 509. If the signal transmitted from the paging base station is lost 510 for a predetermined period of time, the pager will revert to the wide area paging mode 502.

I claim:

1. A method of operating a selective call receiver having a non-volatile memory, the method comprising the steps of:

storing a plurality of operational personalities in said non-volatile memory, each of said plurality of operational personalities having one of a plurality of protocol modes associated therewith;

receiving a signal comprising a location identifier identifying a geographic location of the selective call receiver;

automatically selecting one of said plurality of operational personalities in response to said location identifier; and decoding said signal according to one of said plurality of protocol modes associated with said one of said plurality of operational personalities.

2. The method according to claim 1 wherein said step of storing comprises the step of storing a default personality, the method further comprising the step of:

selecting said default personality when said location identifier does not correspond with any of a plurality of predetermined signals.

3. The method according to claim 1 wherein each of said plurality of operational personalities has one of a plurality of predetermined signals associated therewith and said selecting step comprises the steps of:

comparing said location identifier to each of said plurality of predetermined signals; and selecting one of said plurality of operational personalities if said location identifier is substantially equivalent to one of said plurality of predetermined signals corresponding to said one of said plurality of operating personalities.

4. The method according to claim 1 wherein said selecting step further comprises the step of selecting a receive frequency in response to said location identifier.

5. The method according to claim 1 wherein said selecting step further comprises the step of selecting a local selective call receiver address in response to said location identifier.

6. The method according to claim 1 wherein said selecting step further comprises the step of selecting a selective call receiver presentation mode in response to said location identifier.

7. The method according to claim 1 wherein said selecting step further comprises the step of selecting a selective call receiver operation mode in response to said location identifier.

8. A selective call receiver comprising:

means for storing a plurality of operational personalities, each of said plurality of operational personalities having one of a plurality of protocol modes associated therewith;

means for receiving a signal comprising a location identifier;

means for automatically selecting one of said plurality of operational personalities in response to said location identifier; and means for decoding said signal in accordance with one of said plurality of protocol modes associated with said one of said plurality of operational personalities.

9. The selective call receiver according to claim 8 wherein said means for selecting comprises:

means for selecting a default operational personality when said location identifier does not correspond with any of a plurality of predetermined local area identifiers.

10. The selective call receiver according to claim 8 further comprising a receive frequency control means responsive to said selected one of said plurality of operational personalities.

11. The selective call receiver according to claim 9 further comprising programming means for programming a local area selective call receiver address in response to said selected personality.

12. The selective call receiver according to claim 8 further comprising a selective call receiver presentation mode control means responsive to said selected one of said plurality of operational personalities.

13. The selective call receiver according to claim 8 further comprising a selective call receiver operation mode control means responsive to said selected one of said plurality of operational personalities.

14. A multiple area selective call signalling system comprising:
   means for broadcasting a first signal comprising a first location identifier in a first area;
   means for broadcasting a second signal comprising a second location identifier in a second area; and
   at least one selective call receiver comprising:
      means for storing a plurality of operational personalities, each of said plurality of operational personalities comprising a corresponding one of a plurality of protocol modes;
      means for receiving said first signal in said first area and said second signal in said second area;
      means for selecting one of said plurality of operational personalities for said at least one selective call receiver in response to said first location identifier or said second location identifier; and
      means for decoding said signal in accordance with one of said plurality of protocol modes corresponding to said one of said plurality of operational personalities.

* * * * *